(12) United States Patent
Nagarajegowda (10) Patent No.: US 12,153,647 B2
(45) Date of Patent: Nov. 26, 2024

(54) SCALABLE CAPACITY FORECASTING IN STORAGE SYSTEMS USING A MACHINE LEARNING MODEL

(71) Applicant: Dell Products L.P., Round Rock, TX (US)

(72) Inventor: Deepak Nagarajegowda, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 803 days.

(21) Appl. No.: 17/183,961

(22) Filed: Feb. 24, 2021

(65) Prior Publication Data

US 2022/0269903 A1    Aug. 25, 2022

(51) Int. Cl.
G06F 18/214    (2023.01)
G06F 3/06    (2006.01)
(Continued)

(52) U.S. Cl.
CPC .......... *G06F 18/214* (2023.01); *G06F 3/0604* (2013.01); *G06F 3/0629* (2013.01);
(Continued)

(58) Field of Classification Search
CPC .... G06F 18/214; G06F 3/0604; G06F 3/0629; G06F 3/067; G06F 3/0683; G06F 18/24;
(Continued)

(56) References Cited

U.S. PATENT DOCUMENTS 9,047,574 B2    6/2015    Villeneuve et al.
9,558,200 B2    1/2017    Chamness
(Continued)

FOREIGN PATENT DOCUMENTS

CN    108920324 A  *  11/2018

OTHER PUBLICATIONS

Tan YV, Roy J. Bayesian additive regression trees and the General BART model. Stat Med. Nov. 10, 2019;38(25):5048-5069. doi: 10.1002/sim.8347. Epub Aug. 28, 2019. PMID: 31460678; PMCID: PMC6800811. (Year: 2019).*

(Continued)

*Primary Examiner* — Charles T Shedrick
(74) *Attorney, Agent, or Firm* — Ryan, Mason & Lewis, LLP (57) ABSTRACT

Methods, apparatus, and processor-readable storage media for scalable capacity forecasting in storage systems using a machine learning model are provided herein. An example computer-implemented method includes obtaining historical capacity data for storage objects; partitioning the obtained data into categories, wherein at least a first category comprises data from storage objects associated with a first capacity-related condition, and at least a second category comprises data from storage objects associated with a second capacity-related condition different than the first capacity-related condition; selecting a time series sequence of a designated time interval, and labeling, accordingly, portions of the data in the first category and portions of the data in the second category; training a machine learning model using the labeled data; performing capacity forecasting by processing input capacity data for at least one of the storage objects using the machine learning model; and performing automated actions based on results of the capacity forecasting.

20 Claims, 8 Drawing Sheets

(51) Int. Cl.
*G06F 18/24* (2023.01)
*G06N 20/00* (2019.01)

(52) U.S. Cl.
CPC ............ *G06F 3/067* (2013.01); *G06F 3/0683* (2013.01); *G06F 18/24* (2023.01); *G06N 20/00* (2019.01)

(58) Field of Classification Search
CPC .... G06F 3/0631; G06F 3/0653; G06F 3/0605; G06N 20/00; G06N 20/20
See application file for complete search history.

(56) References Cited

U.S. PATENT DOCUMENTS

| | | | | |
|---|---|---|---|---|
| 10,564,998 | B1* | 2/2020 | Gritter | .................. G06F 9/5083 |
| 11,467,872 | B1* | 10/2022 | Mauer | ..................... G06N 5/04 |
| 11,620,049 | B2* | 4/2023 | Jiang | ..................... G06N 20/00 |
| | | | | 711/154 |
| 2012/0221521 | A1* | 8/2012 | Chiu | ................... G06F 11/3414 |
| | | | | 707/622 |
| 2016/0180356 | A1* | 6/2016 | Parag | ............... G06Q 10/06375 |
| | | | | 705/7.31 |
| 2017/0098239 | A1* | 4/2017 | Yan | .................... G06Q 30/0247 |
| 2020/0192572 | A1* | 6/2020 | Dwarampudi | .......... G06F 3/064 |
| 2021/0200659 | A1* | 7/2021 | Gowda | ............... G06F 11/3034 |
| 2022/0269903 | A1* | 8/2022 | Nagarajegowda | .... G06F 3/0604 |

OTHER PUBLICATIONS

Carbonneau et al., Machine Learning-Based Demand Forecasting in Supply Chains, International Journal of Intelligent Information Technologies, Jan. 2007.

* cited by examiner

Extract capacity metrics for all storage objects in one or more storage systems
For capacity metrics records, find out if object ever became "FULL"
 If "FULL"
  - Identify the timestamp at which storage object was FULL.
  - For each identified timestamp, partition the data by going back a predetermined amount of time and label as "FULL"
 If not "FULL"
  - Iteratively partition the data with equal time partitions .
  - For each of the partitions, label as "NOT FULL"

1 - Extract labelled datasets
2 - Split the labeled datasets into a training dataset and a testing dataset
3 - Load a gradient boosted training algorithm with default model parameters
    - Train a machine learning-based capacity forecasting model with default model parameters
    - Evaluate the model performance
4 – Repeat step 3 until model performance reaches a given level
5 – Save the model

SCALABLE CAPACITY FORECASTING IN STORAGE SYSTEMS USING A MACHINE LEARNING MODEL

FIELD

The field relates generally to information processing systems, and more particularly to storage in such systems.

BACKGROUND

Due in part to data growth, storage systems are becoming increasingly vulnerable to capacity issues. Also, storage systems are becoming increasingly complicated. For example, some storage systems are configured using pools containing hundreds or thousands of storage objects such as logical storage volumes (e.g., logical units or LUNs) and file systems (FS), and include storage management functionality to address oversubscription and other related conditions. Conventional storage management techniques include generating capacity threshold alerts and notifications that are rule-based, typically acting on particular data at the pool level. However, such techniques are disadvantageous because they are compute-intensive and can be used only for a limited number of manually-selected storage objects at a given time.

SUMMARY

Illustrative embodiments of the disclosure provide techniques for scalable capacity forecasting in storage systems using a machine learning model. An exemplary computer-implemented method includes obtaining historical capacity data for multiple storage objects within at least one storage system, and partitioning at least a portion of the obtained historical capacity data into two or more categories, wherein at least a first of the two or more categories comprises data pertaining to at least one of the multiple storage objects associated with a first capacity-related condition, and wherein at least a second of the two or more categories comprises data pertaining to at least one of the multiple storage objects associated with a second capacity-related condition different than the first capacity-related condition. The method also includes selecting, in connection with the obtained historical capacity data, a time series sequence of a designated time interval, and labeling, in accordance with the selected time series sequence, at least a portion of the data in the first category and at least a portion of the data in the second category. Further, the method additionally includes training at least one machine learning model using the labeled data from the first category and the labeled data from the second category, performing capacity forecasting for at least one of the multiple storage objects within the at least one storage system by processing input capacity data for the at least one storage object using the at least one machine learning model, and performing one or more automated actions based at least in part on one or more results of the capacity forecasting performed for the at least one storage object.

Illustrative embodiments can provide significant advantages relative to conventional storage management techniques. For example, problems associated with compute-intensive and scope-limited capacity threshold alert-generating techniques are overcome in one or more embodiments through automatically performing scalable capacity forecasting across storage objects in storage systems using a machine learning model.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
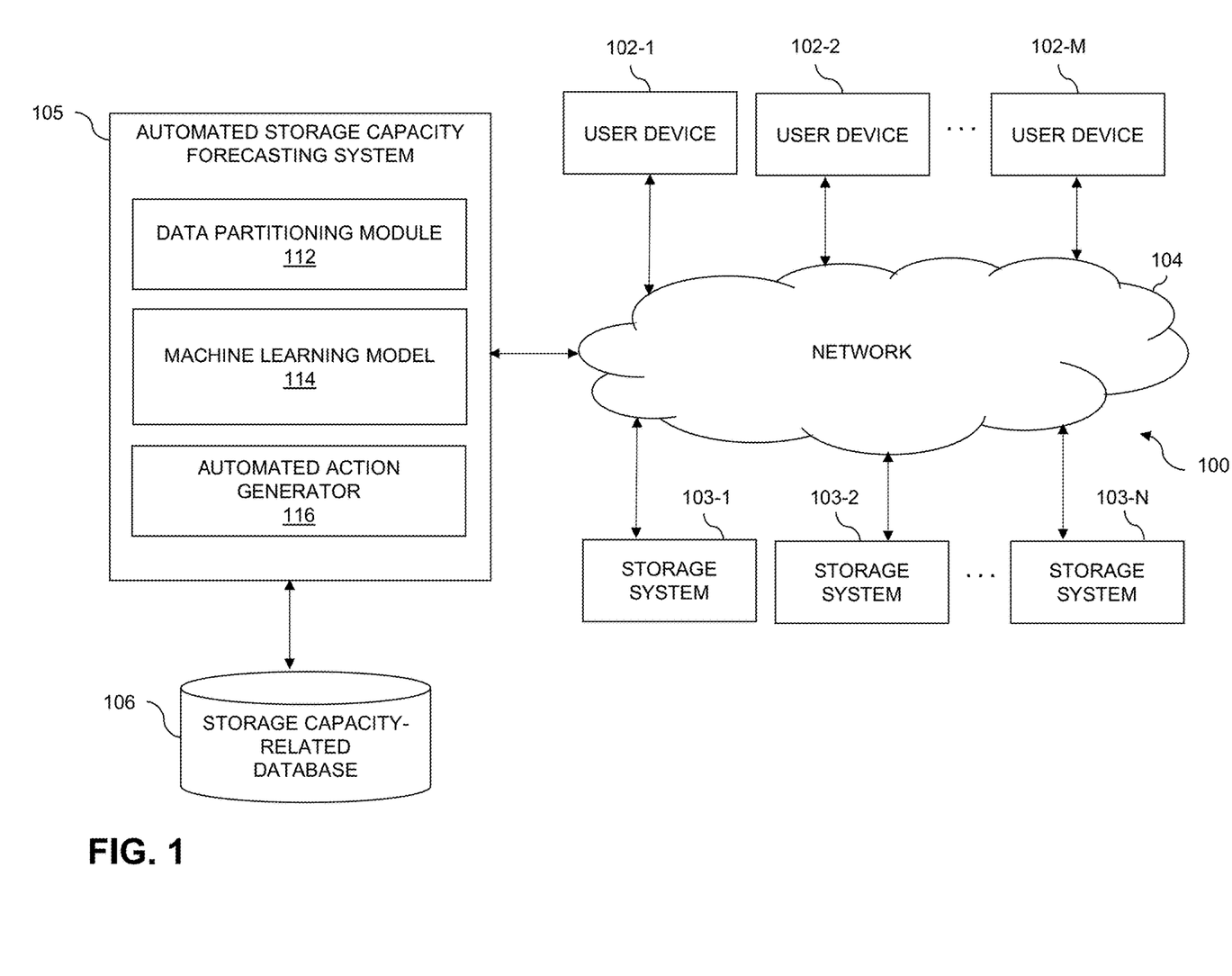
FIG. 1 shows an information processing system configured for scalable capacity forecasting in storage systems using a machine learning model in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102, and a plurality of storage systems 103-1, 103-2, . . . 103-N, collectively referred to herein as storage systems 103. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated storage capacity forecasting system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The storage systems 103 may comprise, for example, storage objects such as pools, file systems, logical storage volumes (e.g., logical units or LUNs), etc. The storage systems 103 in some embodiments comprise respective storage systems associated with a particular company, organization or other enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated storage capacity forecasting system 105 can have an associated database 106 configured to store data pertaining to capacity metrics and other capacity-related information of one or more storage objects of storage systems 103, which comprise, for example, timestamp information, available capacity information, used capacity information, etc.

The database 106 in the present embodiment is implemented using one or more storage systems associated with automated storage capacity forecasting system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated storage capacity forecasting system 105 can be one or more input-output devices, which illustratively comprise keyboards, displays or other types of input-output devices in any combination. Such input-output devices can be used, for example, to support one or more user interfaces to automated storage capacity forecasting system 105, as well as to support communication between automated storage capacity forecasting system 105 and other related systems and devices not explicitly shown.

Additionally, the automated storage capacity forecasting system 105 in the FIG. 1 embodiment is assumed to be implemented using at least one processing device. Each such processing device generally comprises at least one processor and an associated memory, and implements one or more functional modules for controlling certain features of automated storage capacity forecasting system 105.

More particularly, automated storage capacity forecasting system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated storage capacity forecasting system 105 to communicate over the network 104 with the user devices 102 and/or storage systems 103, and illustratively comprises one or more conventional transceivers.

The automated storage capacity forecasting system 105 further comprises data partitioning module 112, machine learning model 114, and automated action generator 116.

It is to be appreciated that this particular arrangement of elements 112, 114 and 116 illustrated in automated storage capacity forecasting system 105 of the FIG. 1 embodiment is presented by way of example only, and alternative arrangements can be used in other embodiments. For example, the functionality associated with elements 112, 114 and 116 in other embodiments can be combined into a single element, or separated across a larger number of elements. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for scalable capacity forecasting in storage systems using machine learning techniques involving storage systems 103 and user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated storage capacity forecasting system 105 and storage capacity-related database 106 can be implemented in at least one of the storage systems 103 and/or in an associated management server or set of servers.

An exemplary process utilizing elements 112, 114 and 116 of an example automated storage capacity forecasting system 105 in computer network 100 will be described in more detail with reference to the flow diagram of FIG. 6.

Accordingly, at least one embodiment includes performing scalable capacity forecasting in storage systems using machine learning techniques. As detailed herein, storage capacity forecasting and planning tools can predict how much storage a system and/or an organization will require so that sufficient capacity (e.g., disk space) can be obtained to meet the needs of users and/or applications. In one or more embodiments, storage capacity forecasting techniques are implemented in approximately real time for all storage objects of one or more given storage systems. As further noted herein, the ability to forecast storage capacity for all storage objects of one or more given storage systems, as carried out in accordance with one or more embodiments, significantly limits costs potentially caused by data loss events and/or data unavailability events.

More specifically, at least one example embodiment can include reading a given number of previous data points (e.g., the previous 168 data points; that is, hourly data points for the previous seven days) for each storage object in at least one given storage system, and processing those data points using one or more machine learning techniques to predict and/or determine one or more outcomes. Such an embodiment, in contrast to various conventional techniques, avoids the need to build one or more regression curves, thereby increasing speed and efficiency. In connection with such an example embodiment, for each storage object (e.g., pool, LUN, FS, etc.) and for every given temporal interval (e.g., every hour), using the given storage object's 168 datapoints, a machine learning model (e.g., a gradient boosted classifier) is trained and saved to disk. This machine learning model is trained to learn data nuances associated with storage objects, including, for example, various seasonality patterns and/or trends associated with the 168 data points.

Additionally or alternatively, one or more embodiments are based at least in part on moving time window methodologies, which are implemented to identify and label time series data for one or more capacity metrics. Such an embodiment includes automatically identifying specific events pertaining to a given storage system and/or storage array in accordance with given time series data. Further, such an embodiment also includes using at least one algorithm (e.g., a binary classifier) to extract specific time series data pertaining to such identified events, and label the extracted data accordingly. Such an embodiment can additionally include taking into account the time series data that have no significant event identified in connection therewith. Using the combination of event-driven time series data and non-event time series data, such an embodiment includes learning one or more nuances associated with the data, and predicting, based at least in part on such learning, whether one or more given events are likely to occur or not.

Accordingly, at least one embodiment includes intelligently using non-supervised data (e.g., time series capacity metric data) to form at least one supervised dataset (e.g., an array of data points that leads to a given event and an array of data points that does not lead to a given event). Such an embodiment can additionally include automatically generating and outputting alerts pertaining to likely data unavailability/data loss (DUDL) events arising from storage objects running out of capacity within a given future period.

As further detailed herein, at least one embodiment includes extracting and/or obtaining historical capacity data (e.g., timestamps, amount of capacity used, amount of capacity available, etc.) for one or more storage objects (e.g., all of the storage objects of a given storage system). By way merely of example, for a first storage object, such data can indicate that the storage object had negligible capacity consumption until July 2020, then the storage object experienced a sudden surge in capacity consumption in July 2020, and then the storage object saw no further capacity consumption until the present date. Additionally, for a second storage object, such data can indicate that capacity consumption for the storage object was very high, but never became full until July 2020, at which point the storage object began experiencing cycles of capacity consumption surges (causing the storage object to become full) followed by periods of capacity availability. By way of further example, for a third storage object, such extracted and/or obtained data can indicate gradual capacity consumption, but never approaching full capacity.

Such an embodiment can subsequently include processing at least a portion (e.g., all) of the obtained historical capacity data into two or more categories (also referred to herein as buckets). By way of example, such buckets can include a first bucket containing data pertaining to storage objects that have never run out of capacity, and a second bucket containing data pertaining to storage objects that have run out of capacity at least once. By way of illustration, consider an example embodiment that includes using such first and second buckets, as detailed below.

For instance, such an example embodiment includes processing at least a portion of time series data from the first bucket (i.e., the bucket containing data pertaining to storage objects that have never run out of capacity) using at least one machine learning-based time window algorithm. Such time series data can be selected for a designated (e.g., fixed) time interval, and the processing of such data can include labeling the data accordingly. Additionally or alternatively, such a processing step can include reading the historical capacity telemetry data in the first bucket, and partitioning the data into multiple equal time partitions (e.g., each partition corresponds to 168 data points; that is, hourly data points for the previous seven days). Further, for each segment of the partitioned data, such an embodiment includes creating and storing at least one data tuple and/or data array.

Additionally, such an example embodiment also includes processing at least a portion of time series data from the second bucket (i.e., the bucket containing data pertaining to storage objects that have run out of capacity at least once) using at least one machine learning-based time window algorithm (e.g., the same machine learning-based time window algorithm as used to process data from the first bucket). Similar to the above steps in connection with the data from the first bucket, such time series data here can be selected for a designated (e.g., fixed) time interval, and the processing of such data can include labeling the data accordingly. Additionally or alternatively, such a processing step can include reading the historical capacity telemetry data in the second bucket, and identifying one or more timestamps at which the storage object capacity was full. For each identified timestamp, such an embodiment includes partitioning the data preceding the identified timestamp into multiple equal time partitions (e.g., each partition corresponds to 168 data points; that is, hourly data points for the previous seven days). Further, for each segment of the partitioned data, such an embodiment includes creating and storing at least one data tuple and/or data array.

Figure 2:
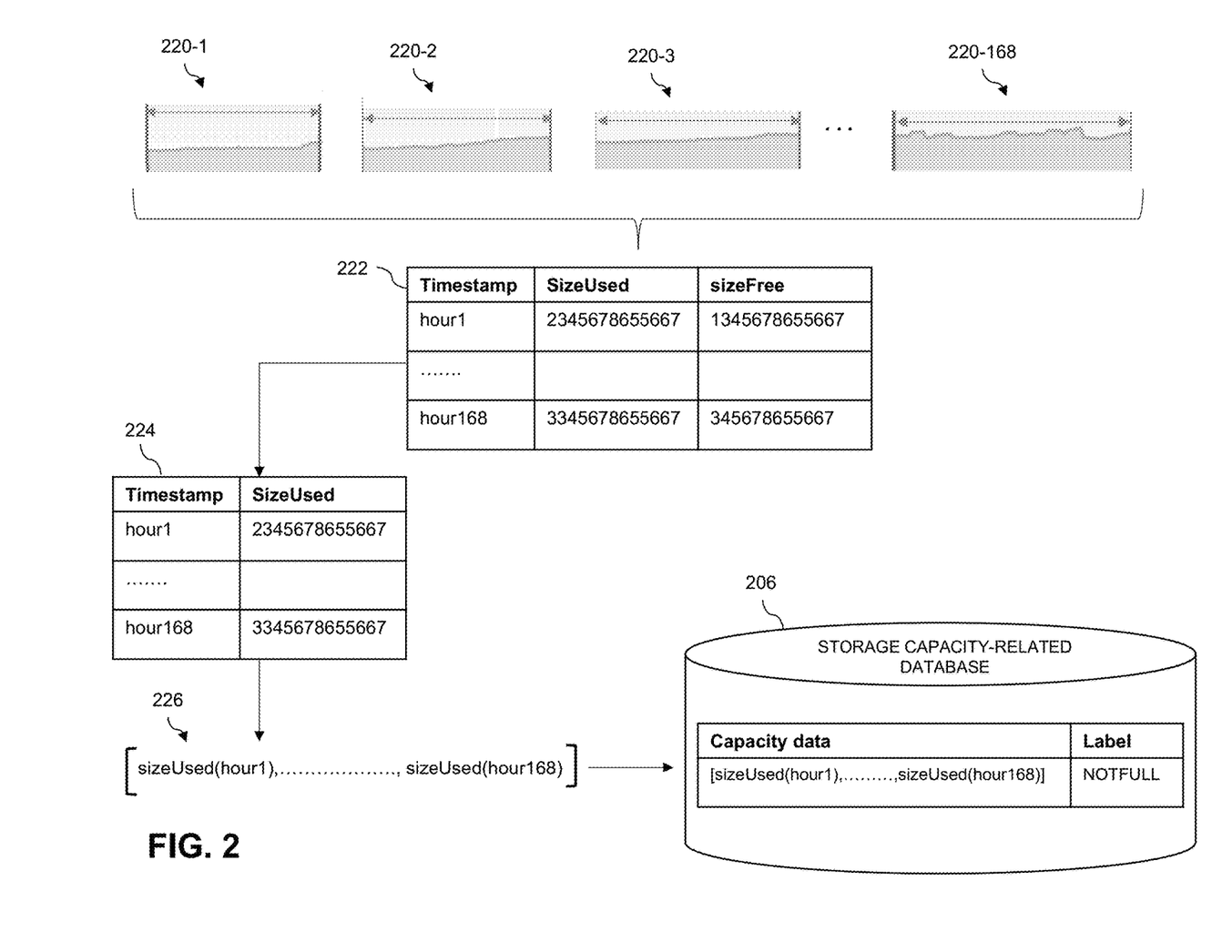
FIG. 2 shows an example workflow for processing partitioned capacity data in an illustrative embodiment.

FIG. 2 shows an example workflow for processing partitioned capacity data in an illustrative embodiment. While FIG. 2 illustrates an example use case analogous to the processing of data from the first bucket, as described above, it is to be appreciated that a similar workflow can be carried out with respect to processing data from the second bucket (in accordance with the example embodiment detailed above). Specifically, FIG. 2 depicts partitioned capacity data 220-1 through 220-168 for a given storage object (e.g., hourly capacity data points for a period of seven days), which is processed to generate table 222 which includes timestamp information along with corresponding values for the amount of capacity used and the amount of available (free) capacity. Table 222 is further processed to create table 224, which simply includes the timestamp information and the corresponding amount of capacity used (which is the variable being forecasted in this example workflow). As also depicted in FIG. 2, such an example embodiment includes creating an array 226 based at least in part on table 224 (e.g., readying the data for processing by a machine learning model), appending a label to array 226, and then storing the labeled array in database 206.

As also detailed herein, at least one embodiment includes using one or more statistical sampling procedures (e.g., under sampling techniques, oversampling techniques, etc.), for example, to augment or filter at least a portion of the labeled data (e.g., labeled data processed from the first and second buckets described in connection with the example embodiment above) to reduce imbalanced in one or more of the datasets in the scenario wherein the number of storage objects that have actually run out of capacity is less than the number of storage objects that have never run out of capacity, or vice versa.

Additionally, one or more embodiments include building and/or training at least one machine learning model (e.g., using at least one machine learning classifier) using the labeled dataset(s). By way of example, in such an embodiment, labeled balanced datasets (generated such as detailed above) will contain capacity metric data from various storage objects within at least one storage system. Accordingly, such an embodiment includes normalizing at least a portion of the values in the datasets to the same scale for training the at least one machine learning model. Further, one or more embodiments include building and/or training the at least one machine learning model using a machine learning binary classifier algorithm (e.g., a gradient boosted classifier).

Also, such an embodiment additionally includes processing input capacity data (e.g., all incoming capacity metric data, obtained in approximately real-time, pertaining to the given storage objects and/or storage system(s) associated with the trained machine learning model) using the at least one trained machine learning model and forecasting capacity information related thereto based on the output of the at least one machine learning model. By way of example, an illustrative embodiment can include obtaining capacity telemetry data for a given storage object (e.g., obtaining such data every hour), extracting, from the obtained data and/or additional previously obtained capacity telemetry data, the most recent 168 hourly data points, and normalizing at least a portion of the extracted data. Further, such an illustrative embodiment includes processing the normalized data using at least one trained machine learning model, and outputting a "FULL" or "NOT FULL" designation, indicating whether the given storage object is likely to run out of capacity in the near future (e.g., within a predetermined temporal period). Additionally or alternatively, such an embodiment can include performing one or more automated actions based at least in part on the output generated by the at least one machine learning model (e.g., automatically providing the output to at least one storage management system, automatically modifying and/or updating one or more storage objects within at least one storage system, updating and/or further training the at least one machine learning model using the output, etc.).

Figure 3:
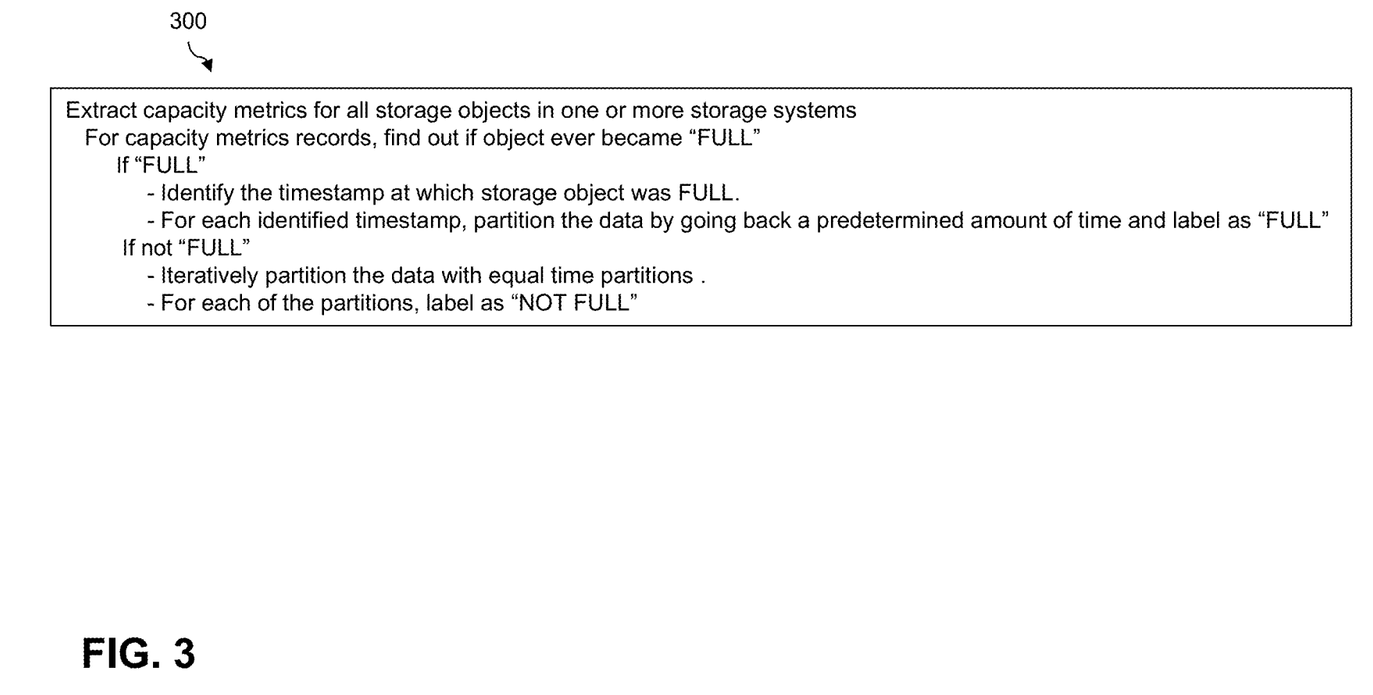
FIG. 3 shows pseudocode for generating a data label in an illustrative embodiment.

FIG. 3 shows pseudocode for generating a data label in an illustrative embodiment. In this embodiment, example pseudocode 300 is executed by or under the control of at least one processing system and/or device. For example, the example pseudocode 300 may be viewed as comprising a portion of a software implementation of at least part of automated storage capacity forecasting system 105 of the FIG. 1 embodiment.

The example pseudocode 300 illustrates steps including extracting capacity metrics for all storage objects in one or more storage systems, and for such capacity metrics records, determining if any of the given storage objects ever reached full capacity (i.e., became "FULL"). If yes (that is, a given storage object had reached full capacity), then pseudocode 300 further includes identifying the timestamp at which the storage object was FULL, and for each identified timestamp, partitioning the data by going back a predetermined amount of time (e.g., 168 hours) and labeling such data as "FULL." If no (that is, a given storage object has not reached full capacity at any point), then pseudocode 300 includes iteratively partitioning the data with equal time partitions (e.g., 168 hourly partitions), and for each of the partitions, labeling such data as "NOT FULL."

It is to be appreciated that this particular example code snippet shows just one example implementation of generating a data label, and alternative implementations of the process can be used in other embodiments.

Figure 4:
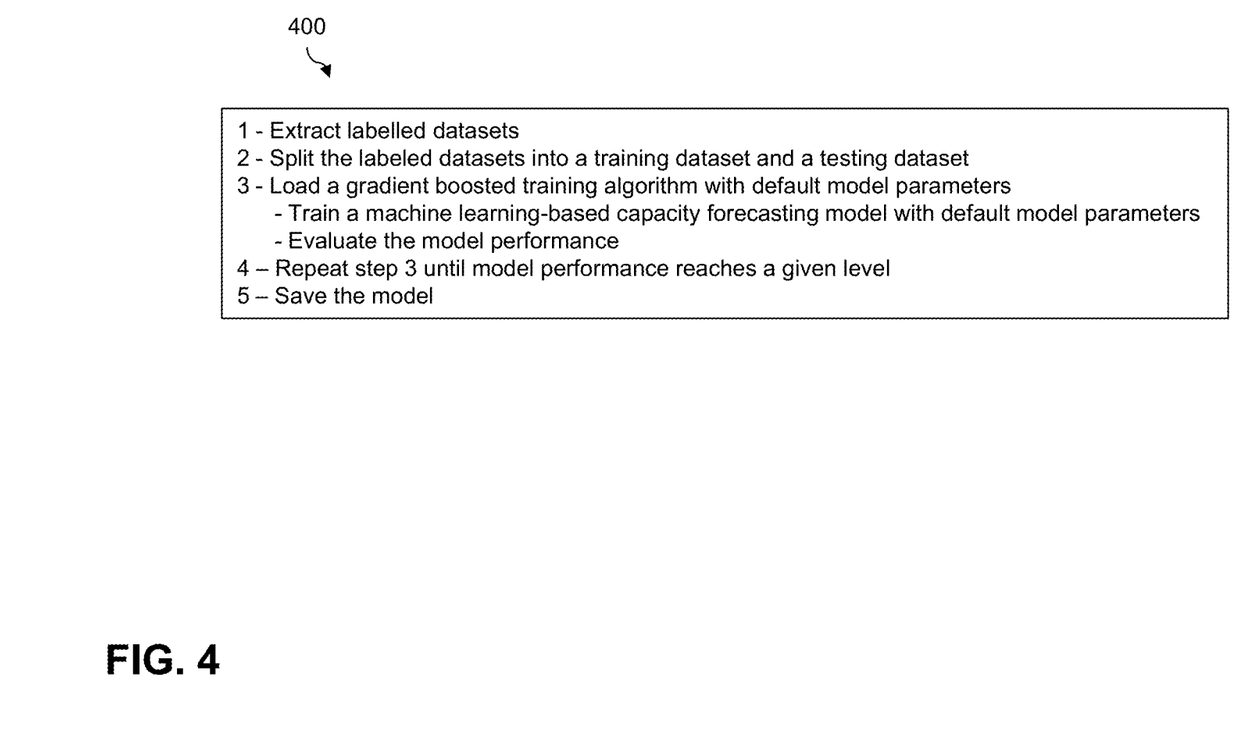
FIG. 4 shows pseudocode for training a machine learning-based capacity forecasting model in an illustrative embodiment.

FIG. 4 shows pseudocode for training a machine learning-based capacity forecasting model in an illustrative embodiment. In this embodiment, example pseudocode 400 is executed by or under the control of at least one processing system and/or device. For example, the example pseudocode 400 may be viewed as comprising a portion of a software implementation of at least part of automated storage capacity forecasting system 105 of the FIG. 1 embodiment.

The example pseudocode 400 illustrates steps including extracting labeled datasets (such as datasets labeled in connection with techniques as detailed in FIG. 3), and splitting and/or partitioning the labeled datasets into at least one training dataset and at least one testing dataset. Additionally, pseudocode 400 includes loading a gradient boosted training algorithm with default model parameters, training a machine learning-based capacity forecasting model using the default model parameters, and evaluating the model performance. These training and evaluating steps are then repeated until model performance reaches a given level (e.g., a predetermined level of optimization). Subsequently, the model is saved for future and/or further use.

It is to be appreciated that this particular example code snippet shows just one example of training a machine learning-based capacity forecasting model, and alternative implementations of the process can be used in other embodiments.

Figure 5:
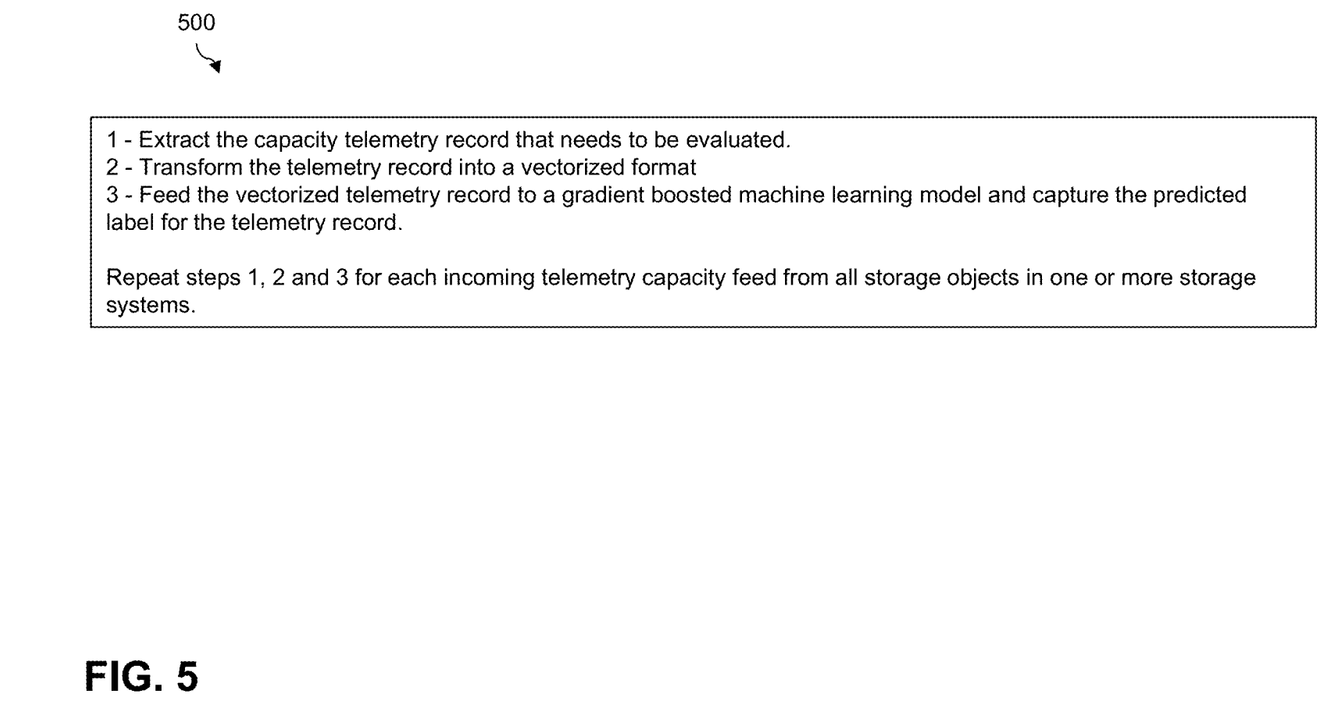
FIG. 5 shows pseudocode for predicting capacity using a trained machine learning-based capacity forecasting model in an illustrative embodiment.

FIG. 5 shows pseudocode for predicting capacity using a trained machine learning-based capacity forecasting model in an illustrative embodiment. In this embodiment, example pseudocode 500 is executed by or under the control of at least one processing system and/or device. For example, the example pseudocode 500 may be viewed as comprising a portion of a software implementation of at least part of automated storage capacity forecasting system 105 of the FIG. 1 embodiment.

The example pseudocode 500 illustrates steps including extracting a capacity telemetry record that needs to be evaluated, and transforming the telemetry record into a vectorized format. Pseudocode 500 also includes processing the vectorized telemetry record using a trained (e.g., such as by using the techniques depicted in FIG. 4) gradient boosted machine learning model, and capturing the predicted label for the telemetry record. Further, as detailed via pseudocode 500, the above-noted steps can be repeated for each incoming telemetry capacity feed from multiple (e.g., all) storage objects in one or more storage systems.

It is to be appreciated that this particular example code snippet shows just one example of predicting capacity using a trained machine learning-based capacity forecasting model, and alternative implementations of the process can be used in other embodiments.

Figure 6:
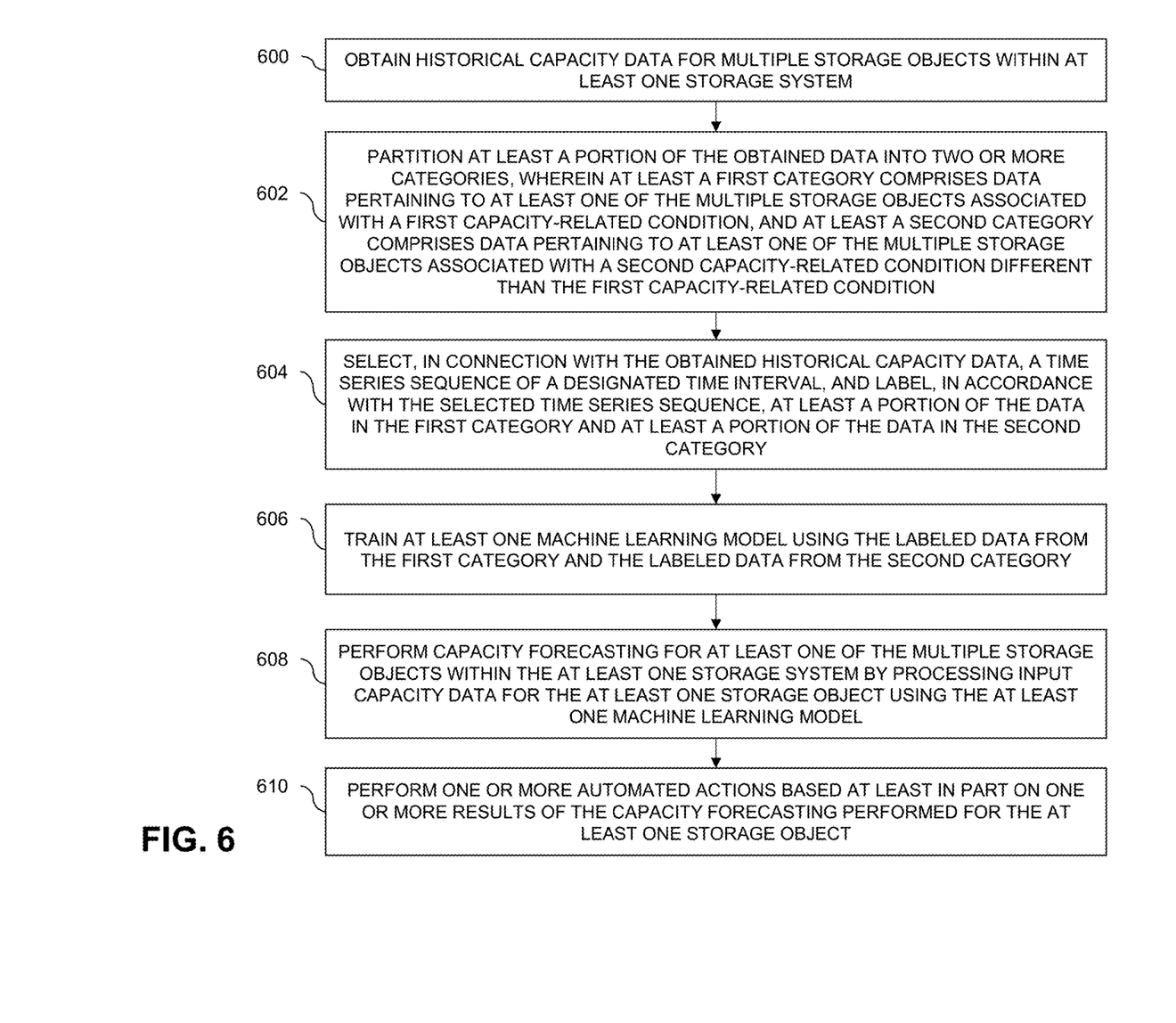
FIG. 6 is a flow diagram of a process for scalable capacity forecasting in storage systems using a machine learning model in an illustrative embodiment.

FIG. 6 is a flow diagram of a process for scalable capacity forecasting in storage systems using a machine learning model in an illustrative embodiment. It is to be understood that this particular process is only an example, and additional or alternative processes can be carried out in other embodiments.

In this embodiment, the process includes steps 600 through 610. These steps are assumed to be performed by the automated storage capacity forecasting system 105 utilizing its elements 112, 114 and 116.

Step 600 includes obtaining historical capacity data for multiple storage objects within at least one storage system. Step 602 includes partitioning at least a portion of the obtained historical capacity data into two or more categories, wherein at least a first of the two or more categories comprises data pertaining to at least one of the multiple storage objects associated with a first capacity-related condition, and wherein at least a second of the two or more categories comprises data pertaining to at least one of the multiple storage objects associated with a second capacity-related condition different than the first capacity-related condition. In one or more embodiments, the first capacity-related condition refers to experiencing full capacity (e.g., using all available storage capacity at least one during a given time period), and the second capacity-related condition refers to not experiencing full capacity (e.g., not using the entirety of available storage capacity at any point during a given time period).

Step 604 includes selecting, in connection with the obtained historical capacity data, a time series sequence of a designated (e.g., fixed) time interval, and labeling, in accordance with the selected time series sequence, at least a portion of the data in the first category and at least a portion of the data in the second category. In at least one embodiment, selecting the time series sequence of a designated time interval includes processing, using at least one time window algorithm, at least a portion of the data in the first category and at least a portion of the data in the second category.

Step 606 includes training at least one machine learning model using the labeled data from the first category and the labeled data from the second category. In at least one embodiment, training the at least one machine learning model includes processing the labeled data from the first category and the labeled data from the second category using at least one machine learning-based binary classifier algorithm.

Step 608 includes performing capacity forecasting for at least one of the multiple storage objects within the at least one storage system by processing input capacity data for the at least one storage object using the at least one machine learning model. Step 610 includes performing one or more automated actions based at least in part on one or more results of the capacity forecasting performed for the at least one storage object. In at least one embodiment, performing the one or more automated actions can include automatically updating the at least one machine learning model, automatically modifying one or more of the multiple storage objects within the at least one storage system, and/or automatically providing at least one notification to at least one storage management system.

The techniques depicted in FIG. 6 can also include balancing, using one or more statistical sampling techniques, at least a portion of the labeled data from the first category and at least a portion of the labeled data from the second category. Further, one or more embodiments can additionally include normalizing at least a portion of the labeled data from the first category and at least a portion of the labeled data from the second category by processing the labeled data from the first category and the labeled data from the second category using one or more feature engineering techniques.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically perform scalable capacity forecasting across storage objects in storage systems using a machine learning model. These and other embodiments can effectively overcome problems associated with compute-intensive and scope-limited capacity threshold alert-generating techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
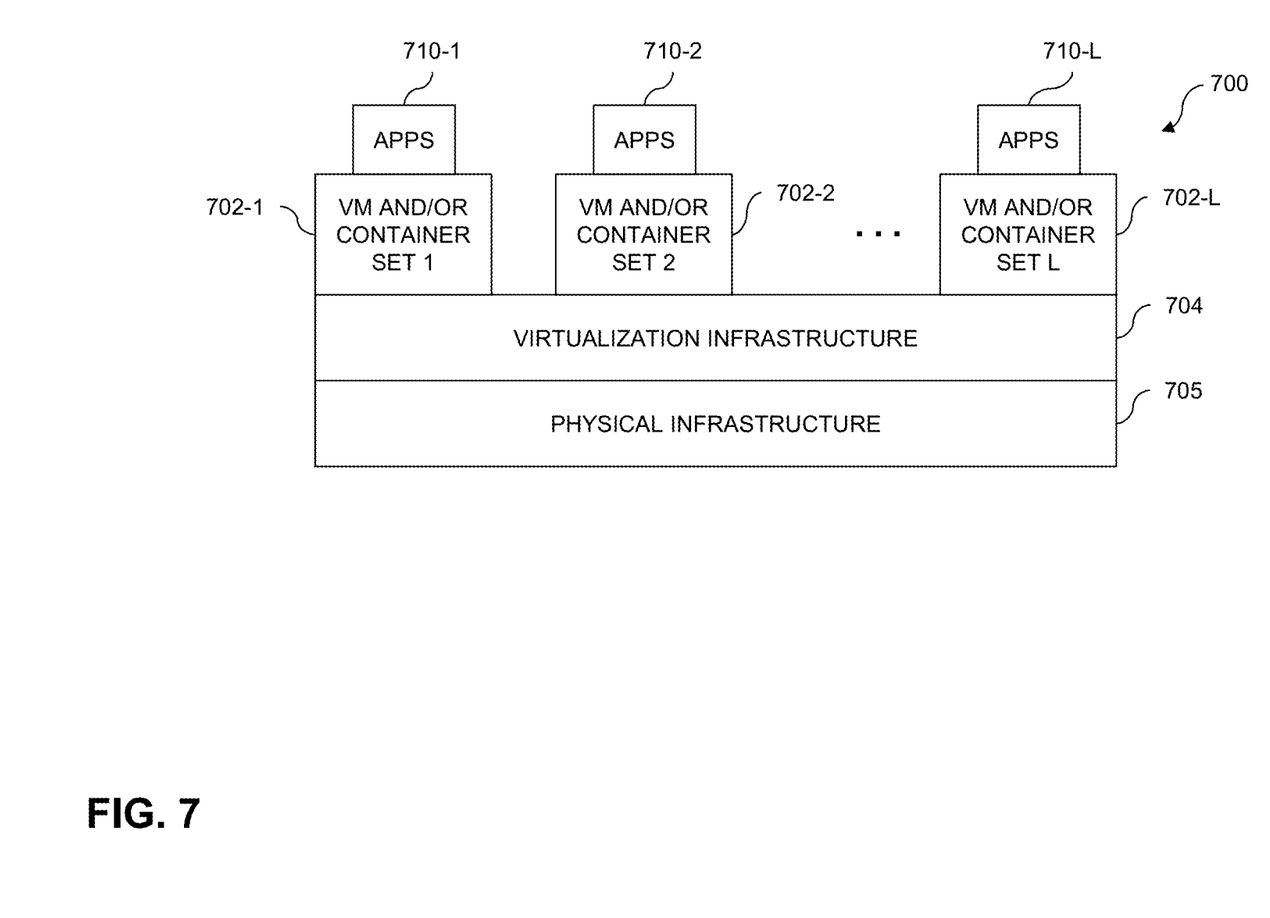
FIGS. 7 and 8 show examples of processing platforms that may be utilized to implement at least a portion of an information processing system in illustrative embodiments.
Figure 8:
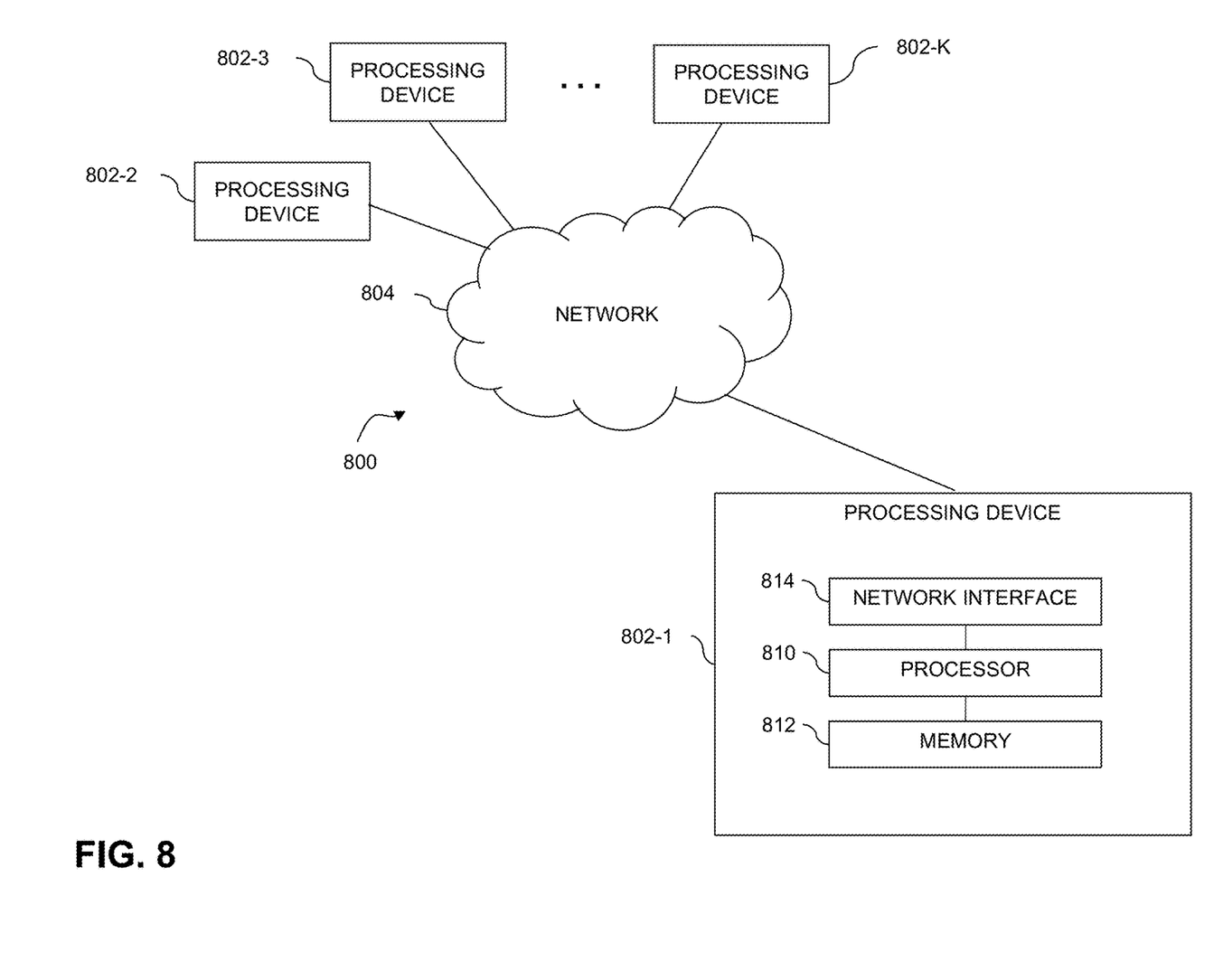

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining historical capacity data for multiple storage objects within at least one storage system;
    partitioning at least a portion of the obtained historical capacity data into two or more categories, wherein at least a first of the two or more categories comprises a portion of the historical capacity data pertaining to at least one of the multiple storage objects associated with a first capacity-related condition, and wherein at least a second of the two or more categories comprises a portion of the historical capacity data pertaining to at least one of the multiple storage objects associated with a second capacity-related condition different than the first capacity-related condition;
    selecting, from the obtained historical capacity data, at least one set of event-driven time series data of a designated time interval and at least one set of non-event-driven time series data of the designated time interval, and labeling, in accordance with the at least one set of event-driven time series data and the at least one set of non-event-driven time series data, at least a portion of the historical capacity data in the first category and at least a portion of the historical capacity data in the second category, wherein the at least one set of event-driven time series data comprises time series data corresponding to at least one specified event pertaining to the at least one storage system;
    training at least one machine learning model using the labeled historical capacity data from the first category and the labeled historical capacity data from the second category;
    performing capacity forecasting for at least one of the multiple storage objects within the at least one storage system by processing input capacity data for the at least one storage object using the at least one machine learning model; and
    performing one or more automated actions based at least in part on one or more results of the capacity forecasting performed for the at least one storage object;
    wherein the method is performed by at least one processing device comprising a processor coupled to a memory.

2. The computer-implemented method of claim 1, wherein training the at least one machine learning model comprises processing the labeled historical capacity data from the first category and the labeled historical capacity data from the second category using at least one machine learning-based binary classifier algorithm.

3. The computer-implemented method of claim 1, wherein selecting the at least one set of event-driven time series data of a designated time interval and the at least one set of non-event-driven time series data of the designated time interval comprises processing, using at least one time window algorithm, at least a portion of the historical capacity data in the first category and at least a portion of the historical capacity data in the second category.

4. The computer-implemented method of claim 1, wherein performing the one or more automated actions comprises automatically updating the at least one machine learning model.

5. The computer-implemented method of claim 1, wherein performing the one or more automated actions comprises automatically modifying one or more of the multiple storage objects within the at least one storage system.

6. The computer-implemented method of claim 1, wherein performing the one or more automated actions comprises automatically providing at least one notification to at least one storage management system.

7. The computer-implemented method of claim 1, further comprising:
    balancing, using one or more statistical sampling techniques, at least a portion of the labeled historical capacity data from the first category and at least a portion of the labeled historical capacity data from the second category.

8. The computer-implemented method of claim 1, further comprising:
    normalizing at least a portion of the labeled historical capacity data from the first category and at least a portion of the labeled historical capacity data from the second category by processing the labeled historical capacity data from the first category and the labeled historical capacity data from the second category using one or more feature engineering techniques.

9. The computer-implemented method of claim 1, wherein the first capacity-related condition comprises experiencing full capacity, and wherein the second capacity-related condition comprises not experiencing full capacity.

10. A non-transitory processor-readable storage medium having stored therein program code of one or more software programs, wherein the program code when executed by at least one processing device causes the at least one processing device:
- to obtain historical capacity data for multiple storage objects within at least one storage system;
- to partition at least a portion of the obtained historical capacity data into two or more categories, wherein at least a first of the two or more categories comprises a portion of the historical capacity data pertaining to at least one of the multiple storage objects associated with a first capacity-related condition, and wherein at least a second of the two or more categories comprises a portion of the historical capacity data pertaining to at least one of the multiple storage objects associated with a second capacity-related condition different than the first capacity-related condition;
- to select, from the obtained historical capacity data, at least one set of event-driven time series data of a designated time interval and at least one set of non-event-driven time series data of the designated time interval, and labeling, in accordance with the at least one set of event-driven time series data and the at least one set of non-event-driven time series data, at least a portion of the historical capacity data in the first category and at least a portion of the historical capacity data in the second category, wherein the at least one set of event-driven time series data comprises time series data corresponding to at least one specified event pertaining to the at least one storage system;
- to train at least one machine learning model using the labeled historical capacity data from the first category and the labeled historical capacity data from the second category;
- to perform capacity forecasting for at least one of the multiple storage objects within the at least one storage system by processing input capacity data for the at least one storage object using the at least one machine learning model; and
- to perform one or more automated actions based at least in part on one or more results of the capacity forecasting performed for the at least one storage object.

11. The non-transitory processor-readable storage medium of claim 10, wherein training the at least one machine learning model comprises processing the labeled historical capacity data from the first category and the labeled historical capacity data from the second category using at least one machine learning-based binary classifier algorithm.

12. The non-transitory processor-readable storage medium of claim 10, wherein selecting the at least one set of event-driven time series data of a designated time interval and the at least one set of non-event-driven time series data of the designated time interval comprises processing, using at least one time window algorithm, at least a portion of the historical capacity data in the first category and at least a portion of the historical capacity data in the second category.

13. The non-transitory processor-readable storage medium of claim 10, wherein performing the one or more automated actions comprises automatically updating the at least one machine learning model.

14. The non-transitory processor-readable storage medium of claim 10, wherein performing the one or more automated actions comprises automatically modifying one or more of the multiple storage objects within the at least one storage system.

15. The non-transitory processor-readable storage medium of claim 10, wherein the program code when executed by the at least one processing device causes the at least one processing device:
- to balance, using one or more statistical sampling techniques, at least a portion of the labeled historical capacity data from the first category and at least a portion of the labeled historical capacity data from the second category.

16. An apparatus comprising:
- at least one processing device comprising a processor coupled to a memory;
- the at least one processing device being configured:
  - to obtain historical capacity data for multiple storage objects within at least one storage system;
  - to partition at least a portion of the obtained historical capacity data into two or more categories, wherein at least a first of the two or more categories comprises a portion of the historical capacity data pertaining to at least one of the multiple storage objects associated with a first capacity-related condition, and wherein at least a second of the two or more categories comprises a portion of the historical capacity data pertaining to at least one of the multiple storage objects associated with a second capacity-related condition different than the first capacity-related condition;
  - to select, from the obtained historical capacity data, at least one set of event-driven time series data of a designated time interval and at least one set of non-event-driven time series data of the designated time interval, and labeling, in accordance with the at least one set of event-driven time series data and the at least one set of non-event-driven time series data, at least a portion of the historical capacity data in the first category and at least a portion of the historical capacity data in the second category, wherein the at least one set of event-driven time series data comprises time series data corresponding to at least one specified event pertaining to the at least one storage system;
  - to train at least one machine learning model using the labeled historical capacity data from the first category and the labeled historical capacity data from the second category;
  - to perform capacity forecasting for at least one of the multiple storage objects within the at least one storage system by processing input capacity data for the at least one storage object using the at least one machine learning model; and
  - to perform one or more automated actions based at least in part on one or more results of the capacity forecasting performed for the at least one storage object.

17. The apparatus of claim 16, wherein training the at least one machine learning model comprises processing the labeled historical capacity data from the first category and the labeled historical capacity data from the second category using at least one machine learning-based binary classifier algorithm.

18. The apparatus of claim 16, wherein selecting the at least one set of event-driven time series data of a designated time interval and the at least one set of non-event-driven time series data of the designated time interval comprises processing, using at least one time window algorithm, at least a portion of the historical capacity data in the first category and at least a portion of the historical capacity data in the second category.

19. The apparatus of claim 16, wherein performing the one or more automated actions comprises automatically updating the at least one machine learning model.

20. The apparatus of claim 16, wherein the at least one processing device is further configured:
    to balance, using one or more statistical sampling techniques, at least a portion of the labeled historical capacity data from the first category and at least a portion of the labeled historical capacity data from the second category.

* * * * *